US008610813B2

(12) United States Patent
Gao et al.

(10) Patent No.: US 8,610,813 B2
(45) Date of Patent: Dec. 17, 2013

(54) SYSTEM AND METHOD FOR EXTENDING DEPTH OF FIELD IN A LENS SYSTEM BY USE OF COLOR-DEPENDENT WAVEFRONT CODING

(75) Inventors: Lu Gao, San Jose, CA (US); Adam Douglas Greengard, Broomfield, CO (US)

(73) Assignee: OmniVision Technologies, Inc., Santa Clara, CA (US)

( * ) Notice: Subject to any disclaimer, the term of this patent is extended or adjusted under 35 U.S.C. 154(b) by 378 days.

(21) Appl. No.: 13/149,707

(22) Filed: May 31, 2011

(65) Prior Publication Data
US 2012/0307133 A1    Dec. 6, 2012

(51) Int. Cl.
*H04N 5/228* (2006.01)
*H04N 5/225* (2006.01)
*G06K 9/40* (2006.01)
*G02B 27/10* (2006.01)

(52) U.S. Cl.
USPC ........ 348/342; 348/222.1; 348/340; 382/255; 359/626

(58) Field of Classification Search
USPC .......... 348/222.1, 224.1, 273, 276, 277, 335, 348/340, 342; 382/255; 359/626
See application file for complete search history.

(56) References Cited

U.S. PATENT DOCUMENTS

| | | | |
|---|---|---|---|
| 4,808,501 A | 2/1989 | Chiulli | |
| 5,096,801 A | 3/1992 | Koya et al. | |
| 5,748,371 A | 5/1998 | Cathey, Jr. et al. | |
| 6,711,302 B1 | 3/2004 | Lee | |
| 7,218,448 B1 | 5/2007 | Cathey, Jr. et al. | |
| 7,260,251 B2 | 8/2007 | Dowski, Jr. et al. | |
| 7,379,613 B2 | 5/2008 | Dowski, Jr. et al. | |
| 7,436,595 B2 | 10/2008 | Cathey, Jr. et al. | |
| 7,751,619 B2 | 7/2010 | Kawanishi et al. | |
| 2005/0259162 A1 | 11/2005 | Shan | |
| 2005/0259886 A1 | 11/2005 | Shan | |
| 2006/0204861 A1* | 9/2006 | Ben-Eliezer et al. | 430/5 |
| 2009/0213321 A1 | 8/2009 | Galstian et al. | |
| 2009/0316097 A1 | 12/2009 | Presniakov et al. | |
| 2010/0007807 A1 | 1/2010 | Galstian et al. | |

OTHER PUBLICATIONS

Notice of Allowance issued in U.S. Appl. No. 13/179,488 dated Feb. 5, 2013, 8 pages.
File History of U.S. Appl. No. 13/323,394; Title of Invention: Imaging System and Method having Extended Depth of Field; filed Dec. 12, 2011.
File History of U.S. Appl. No. 13/149,707; Title of Invention: System and Method for Extending Depth of Filed in a Lens System by use of Color-Dependent Wavefront Coding; filed May 31, 2011.

(Continued)

*Primary Examiner* — Daniel M Pasiewicz
(74) *Attorney, Agent, or Firm* — Lathrop & Gage LLP

(57) ABSTRACT

An optical system for generating an image having extended depth of field. The system includes a phase mask and a chromatic wavefront coding lens. The chromatic wavefront coding lens provides axial color separation of light by generating specified chromatic aberration in an image created by the lens. The phase mask causes the optical transfer function of the optical system to remain substantially constant within a specified range away from the image plane, and the optical transfer function of the system contains no zeroes within at least one spectral passband of interest. Digital processing may be performed on the image to generate a final image by reversing a decrease in modulation transfer function generated by the phase mask.

24 Claims, 3 Drawing Sheets

(56) References Cited

OTHER PUBLICATIONS

Fales, Carl L., et al. "Wiener Restoration of Sampled Image Data: End-to-End Analysis", J. Opt. Soc. Am. A/vol. 5, No. 3, pp. 300-314, Mar. 1988.

Dowski, Jr., Edward R., et al. "Extended Depth of Field Through Wave-Front Coding", Applied Optics, vol. 34, No. 11, pp. 1859-1866, Apr. 10, 1995.

Cathey, W. Thomas, et al. "New Paradigm for Imaging Systems", Applied Optics, vol. 41, No. 29, pp. 6080-6092, Oct. 10, 2002.

Narayanswamy, Ramkumar, et al. "Iris Recognition at a Distance with Expanded Imaging Volume", CDM Optics, Inc., 12 pages.

Cossairt, O., et al. "Spectral Focal Sweep: Extended Depth of Field from Chromatic Aberrations", IEEE International Conference on Computational Photography (ICCP), Mar. 2010.

Tisse, Christel-Loic, et al. "Extended Depth-of-Field (EDoF) Using Sharpness Transport Across Colour Channels", 2008.

\* cited by examiner

SYSTEM AND METHOD FOR EXTENDING DEPTH OF FIELD IN A LENS SYSTEM BY USE OF COLOR-DEPENDENT WAVEFRONT CODING

RELATED APPLICATIONS

U.S. Pat. No. 7,218,448, Extended Depth Of Field Optical Systems, is herewith included by reference.

BACKGROUND

Typical cameras have limited depth of field (depth of focus). The depth of field depends on camera's aperture, where smaller aperture results in a relatively larger depth of field (e.g., a pinhole camera provides infinite depth of field). However, large aperture and large depth of field are both simultaneously desirable. One general approach to this problem is 'wavefront coding', which provides an image with an extended depth of field (EDoF). Within this basic approach, it is desirable to further extend the depth of field of lens systems to improve camera performance.

SOLUTION/SUMMARY

The present system uses a phase mask, either a separate phase mask or a phase mask that is integrated into existing lens elements, to wavefront code an image in a color-dependent manner, thereby generating an axially separated image with a separate different optical transfer function (OTF) for each color channel, R, G, and B, and the OTF of individual color channels exhibits an extended depth of field and contains no zeroes within a limited spatial frequency range.

In one embodiment, only a single color channel is processed with a single deconvolution filter instead of separate processing of individual color channels. In this embodiment, the signal processing used is a conversion of the image from RGB color space to YUV color space, deconvolution of the Y channel using either pre-measured point spread functions or the point spread functions taken from the model, then conversion back to RGB color space. The U and V channels are left unprocessed.

DETAILED DESCRIPTION

Figure 1A:
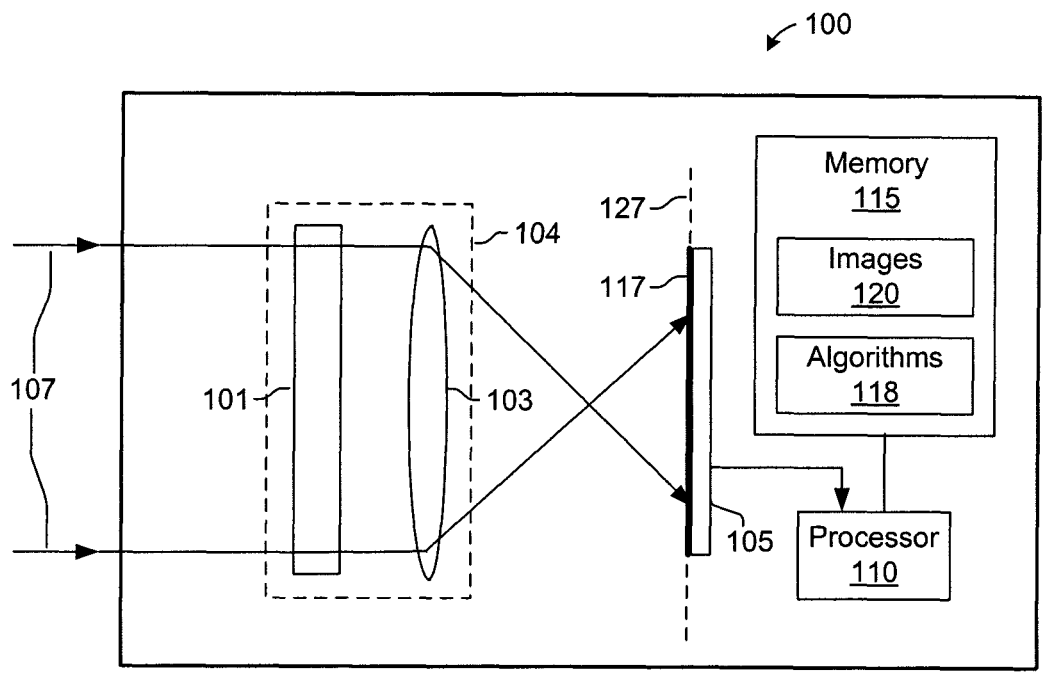
FIG. 1A is a diagram showing exemplary components of one embodiment of the present system.

FIG. 1A is a diagram showing exemplary high-level components of the present optical system 100 for providing extended depth of field (EDoF). As shown in FIG. 1A, in an exemplary embodiment, the present system 100 comprises a color-dependent wavefront coding lens system 104 including a phase mask 101 (or an existing lens element (e.g., lens 103) in which the phase mask function is embedded) and an imaging lens (or compound lens assembly) 103 for focusing light 107 that is received from an object into an image plane 127. Optical system 100 further includes an image sensor 105 (e.g., a charge-coupled device "CCD" or a complementary metal oxide semiconductor device "CMOS"), one surface of which is proximate image plane 127, for capturing an electrical representation of the light that is incident at the image plane. System 100 also includes a processor 110 with associated memory 115 in which is stored image processing algorithms 118 and digital images 120 captured by sensor 105.

Sensor 105 has an overlaid color filter mosaic 117, which may have a Bayer pattern or other mosaic pattern, such as that described below with respect to FIG. 5. Color filter mosaic 117 thus provides for specific groups of pixels of sensor 105 to operate in differing spectral passbands of interest, where each spectral passband of interest consists of a range of wavelengths passed by similar elements of filter mosaic 117 to their respective pixels. Sensor 105 provides output within a limited spatial frequency range, that is, a spatial frequency range that is ultimately limited by pixel-to-pixel spacing of the sensor, but can also be defined as a range of spatial frequencies less than the range limited by the pixel-to-pixel spacing.

The present lens system 104 incorporates a chromatic wavefront coding element, or lens, 103 to achieve axial color separation by having the lens 103 designed to provide a predetermined amount of chromatic aberration, while at the same time, the optical transfer function (OTF) of at least one color channel contains no zero values across a certain range of spatial frequencies within an extended depth of focus. Lens 103 is thus hereinafter referred to as a 'chromatic wavefront coding lens'.

Integrated Mask/lens

Figure 1B:
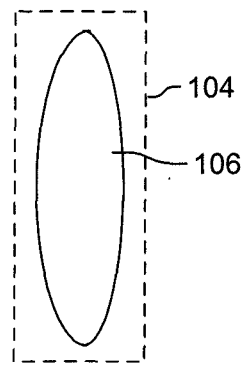
FIG. 1B is a diagram showing an exemplary integrated mask/lens.

FIG. 1B is a diagram showing an exemplary integrated mask/lens 106. In one embodiment, as shown in FIG. 1B, lens system 104 comprises a wavefront coding phase mask integrated with a chromatic wavefront coding lens to form a single integrated phase mask/chromatic wavefront coding lens 106 specifically designed to provide a chromatic wavefront coding function. Each embodiment described herein combines wavefront coding with chromatic aberration to provide EDoF, and is an implementation of the wavefront coding imaging technique described below.

Imaging with Wavefront Coding

Wavefront coding modifies a sensor-based optical system in such a manner as to preserve certain aspects of the image being formed in the presence of optical aberrations such as defocus. When a final (e.g., human-viewable) image is desired, signal processing may be employed to decode an intermediate image formed on the sensor. The signal processing is determined by the coding that is impressed on the wavefront by the system optics by use of a phase mask, such as element 101. This signal processing takes into account the spatial integration provided by the width, height, and spacing of the sensor's pixel array. The final image in a system using wavefront coding is the combined result of the optics that encode the wavefront and the signal processing that decodes the intermediate image to form the final image.

More specifically, in wavefront coding, a suitable optical transfer function for a lens is created by use of a specifically-designed phase mask (wavefront coding element) to produce point-spread functions of images having manipulatable information such as depth of field. The phase mask causes the optical transfer function to remain substantially constant within some range away from the in-focus position, or image plane, of the lens. The phase mask is constructed and positioned to alter the optical transfer function of the optical system such that the altered optical transfer function is substantially insensitive to an unknown distance between the object and the lens over a greater range of object distances than was provided by the unaltered optical transfer function. The insensitivity of the OTF over the greater range of object distances means the resulting image is insensitive to such range of distances, that is, the depth of field of the system is increased. However, the increased depth of field usually results in a decrease of the modulation transfer function (MTF), mathematically defined as the modulus of the OTF, and corresponding to contrast of the image over a spatial frequency range. The higher the MTF, the greater the contrast at a given spatial frequency.

Digital processing can be used to undo the MTF decrease of the mask, thus restoring the contrast of the image, while the altered OTF means the image remains in focus over the extended depth of field. Depth of field post-processing is performed on the stored image to restore the image by undoing the MTF decrease caused by the phase mask, so that the effects of the mask (other than the increased depth of field) are removed.

A phase mask 101 for extending the depth of field of an optical system may be constructed by examining the ambiguity functions of several candidate mask functions to determine which particular mask function has an optical transfer function which is closest to constant over a predetermined or specified range of object distances, and manufacturing a mask having the mask function of that particular candidate. For example, the specified range may be 1.001 times the normal depth of field, or 2 or more times the normal depth of field.

The present method employs a phase mask (e.g., phase mask 101 in FIG. 1A) to modify an incoherent imaging system (e.g., wavefront coding lens system 104) in such a way that the point-spread function (PSF) is tolerant to misfocus, while the optical transfer function (OTF) has no regions of zero values within a spectral passband of interest (e.g., within each color channel of the optical system), thus allowing digital processing to be used to restore contrast of the sampled intermediate image.

Furthermore, because the OTF is tolerant to misfocus, the same digital processing restores contrast of the image for a wider range of misfocus. This combined optical-digital system produces a PSF that is comparable to that of the diffraction-limited PSF but over a far larger region of focus. The term 'wavefront coding' is used herein to describe the general process of modifying an incoherent optical system and a received incoherent wave front by means of a phase mask to result in an altered OTF that is insensitive to object distance as compared to an unaltered OTF without the phase mask, and without introducing zeroes into the OTF. By modifying only the phase of the received wavefront, specific wavefront coding techniques allow EDoF to be achieved without the loss of light.

In each of the embodiments shown herein, lens system 104 includes a phase mask, which takes the form of an EDoF surface, for example, a cubic.

Equation 1, below, describes the form of a cubic phase mask:

$$z = \alpha(x^3 + y^3)$$ Equation 1 where α is a scaling constant used to control the maximum amount of wavefront modulation, and x and y are spatial coordinates perpendicular to the optic axis.

If an optical surface with the form mathematically described by Equation 1 is placed in the aperture stop of a lens system, such as the wavefront coding lens system 104 shown in FIG. 1A, or if that form is combined with a lens near the aperture stop to generate integrated mask/lens element 106 as shown in FIG. 1B, the depth of focus of the lens system can be extended. Each type of phase mask has an operating range over which there is an extended depth of field. In Equation 1 above, which describes a simple cubic phase system, this range is determined by the value of α.

The effect of the phase mask may be removed by use of a deconvolution filter applied to the intermediate image formed by the wavefront coding lens system 104. Typically, a deconvolution filter is implemented by a digital signal processing algorithm which provides the inverse of the optical system MTF. For example, a Wiener filter can be applied [Fales et. al., "Wiener restoration of sampled image data: end-to-end analysis," J. Opt. Soc. Am. A, vol. 5, no. 3, pp. 300-314 (1988)]. In the present system, deconvolution/filtering is performed by one or more image processing algorithms 118.

Different forms of phase mask 101 or integrated phase mask/lens 106 can be implemented in accordance with the present optical system, depending on the specific application.

Figure 2:
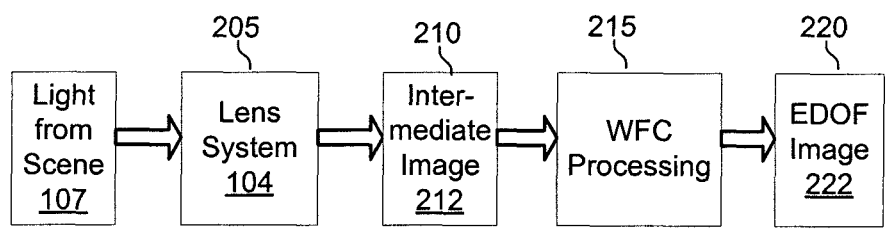
FIG. 2 is a flowchart showing exemplary steps performed by the present system in one embodiment.

FIG. 2 is a flowchart showing steps performed by the present system in an exemplary embodiment. As shown in FIG. 2, at step 205, light 107, from a scene to be imaged, passes through lens assembly 104 in which phase mask 101 generates a intermediate image 212 with wavefront coding, that is recorded by sensor 105 at step 210.

Wavefront coding modifies a sensor-based optical system in such a manner as to preserve certain aspects of the image being formed in the presence of optical aberrations such as defocus. Signal processing may be employed to decode an intermediate image formed on the sensor. When used, signal processing is determined by the coding that is impressed on the wavefront by the system optics by use of a phase mask, such as phase mask 101 in FIG. 1A. The final image in a system with wavefront coding is the combined result of the optics that encode the wavefront and the signal processing that decodes the intermediate image to form the final image.

Figure 4:
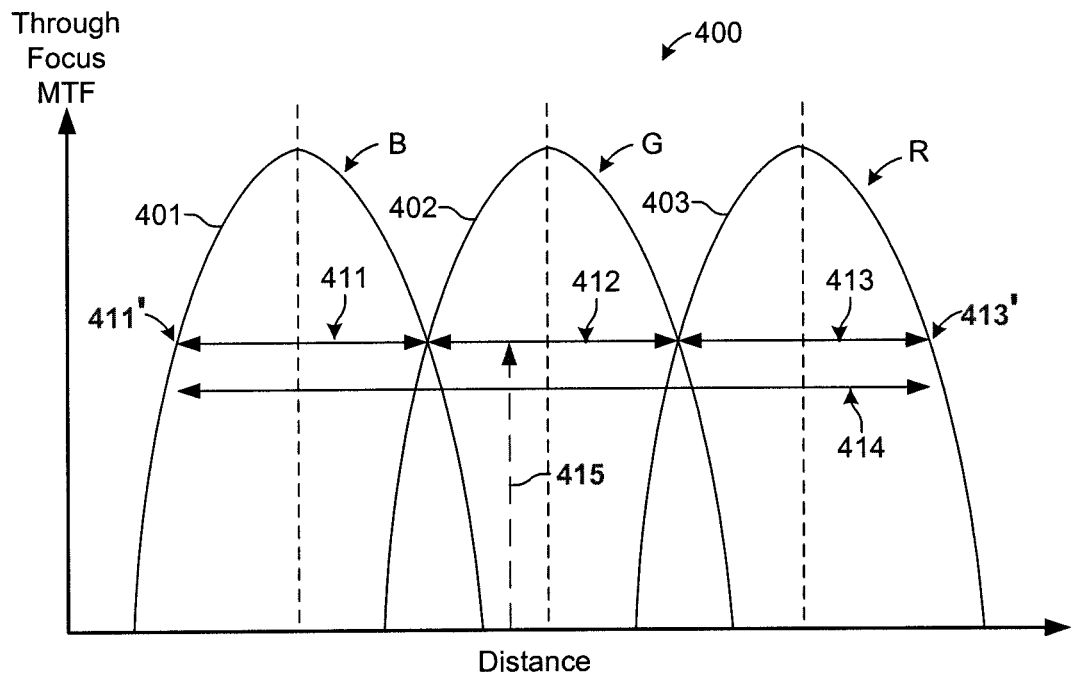
FIG. 4 is a diagram showing the combined EDoF of an exemplary chromatic aberration lens.

In the present system, a suitable optical transfer function for a lens is created by use of a specifically-designed phase mask 101 to produce point-spread functions of images having manipulatable information such as depth of field. Lens system 104 forms three axially separated images [e.g., images 401, 402, and 403, as shown in FIG. 4, described below] with a separate optical transfer function for each corresponding color channel, R, G, and B. In addition to the axial color separation between the color channels, the OTF of each color channel also shows wavefront coding features.

Digital processing, performed at step 215, may reverse the optical transfer function-modifying effects of phase mask 101, resulting in the resolution of an in-focus image over an increased depth of field to generate EDoF image 222. In one embodiment, depth of field post-processing is performed on R, G, and B channel information. In this particular embodiment, at step 215, the R, G, and B channels with wavefront coding in intermediate image 230 are then reconstructed using filters implemented by algorithms 118. The R', G', and B' channels are then combined, at step 235, to generate a final image with an EDoF that spans the combined depth-of-field of the R, G, and B images.

Figure 3:
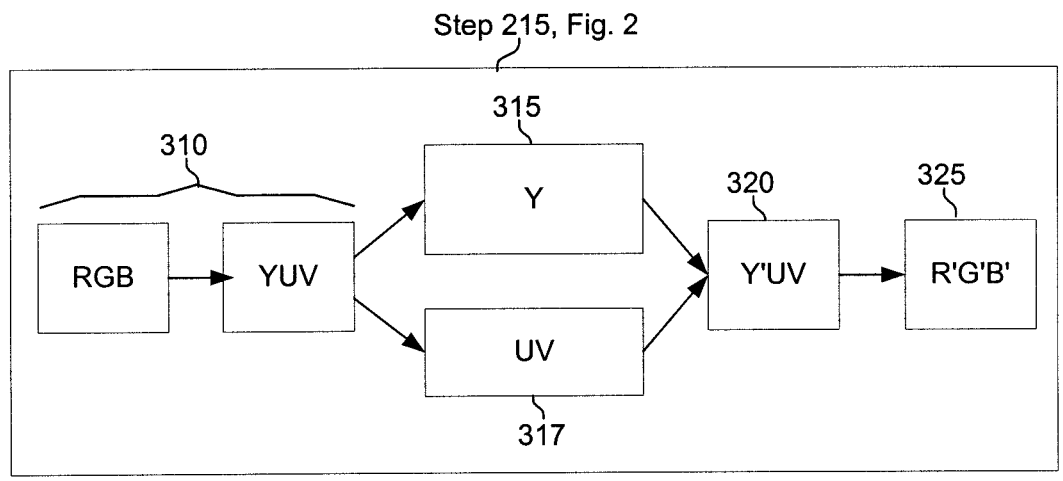
FIG. 3 is a diagram showing exemplary steps performed in processing of an image with wavefront coding.

FIG. 3 is a diagram showing exemplary details of the processing performed in step 215 of FIG. 2, in an alternative embodiment. In this embodiment, depth of field post-processing is performed on the stored Y channel information to restore the image by reversing the optical transfer alteration accomplished by mask 101. As shown in FIG. 3, in processing an image, the image is first converted from the RGB color space to the YUV color space, at step 310. In the YUV color space, the luminance is denoted by Y, and U and V are the chrominance (color) components. Y' is the processed (filtered or deconvolved) version of the Y channel.

In a monochromatic lens with wavefront coding, the modulation transfer function (MTF) for each of the three colors (R, G, B) are very close, whereas with the present chromatic wavefront coding lens 103, the MTFs for the three colors are quite distinct. The fact that the white light MTFs are similar is advantageous to operation of the present method. Lens 101 intentionally has some amount of axial color aberration, which every lens exhibits. Normally, a lens design minimizes the axial color, and the method of designing a lens with axial color is the same as for other lenses, except instead of optimizing for zero axial color, lens 103 is optimized for a non-zero amount of axial color. More specifically, lens 103 is designed to have some predetermined, or specified, amount of chromatic aberration which is a function of the amount of depth of field extension required; for example, the specified chromatic aberration may be determined by the minimum MTF requirement at the spatial frequency of interest within a specified extended depth of field. For example, to achieve the maximum extended depth of field, the axial color separation between adjacent color channels can be increased until the cross point between the two through-focus MTFs meets the minimum MTF requirement of a particular imaging application. For some machine-vision applications, a typical minimum MTF requirement is approximately 0.2 at the spatial frequency of interest.

In the YUV color space, the Y channel (the luminance channel) is essentially a white light channel, and is a combination of the three color channels, R, G, and B. At step 315, the Y channel is filtered with a deconvolution filter designed to gain the MTF back to a diffraction-limited-like response, creating a Y' channel. In the present system, the U and V channels (chrominance channels) are left unprocessed (step 317) and recombined with the processed Y' channel, at step 320, to yield a Y'UV image. The image is then converted back to the RGB color space, at step 325, to generate the final R'G'B' image 222 with extended depth-of-field. Because only the Y channel is processed, only the white light MTF is of concern in this embodiment.

FIG. 4 is a diagram 400 showing the resultant EDoF 414 of an exemplary lens system 104. As shown in FIG. 4, the depth of field of an imaging lens can be extended by combining the R, G, and B channels of an image, convoluted by a suitable chromatic wavefront coding lens 103. The continuous in-focus depth-of-field of the lens is thereby expanded to the range 414 between the object distance 411' at the closest in-focus Blue image component 411 and the object distance 413' at the most distant in-focus Red image component 413, at the highest common through-focus MTF (indicated by arrow 415) that provides continuous in-focus images of the Red, Green, and Blue image components (411+412+413).

By separating the R, G, and B through focus MTFs as shown in FIG. 4, the average (average over all wavelengths or colors) through focus MTF is nearly constant over the distance 411+412+413. Because the average MTF corresponds to the luminance channel of the image, a sharp image (an image having high MTF) in the luminance channel can be recovered by deconvolution for objects falling in any focal plane over the entire 411+412+413 range. Because the human eye is most sensitive to MTF in the luminance channel this image will appear sharp to a viewer, even though the chrominance channels are relatively blurrier (i.e., they have a lower MTF).

Furthermore, because the average MTF is nearly constant over this range, the deconvolution filter for recovery of a sharp image in the luminance channel is the same regardless of which focal plane an object falls into, so the entire sharpening operation can be done with a single linear filtering operation. In a traditional lens, the R, G, and B through focus MTFs would nearly overlap each other, making the average through focus MTF extend essentially only the distance indicated by arrow 412.

Sensor Filter Mosaic with White Light Pixel

Figure 5A:
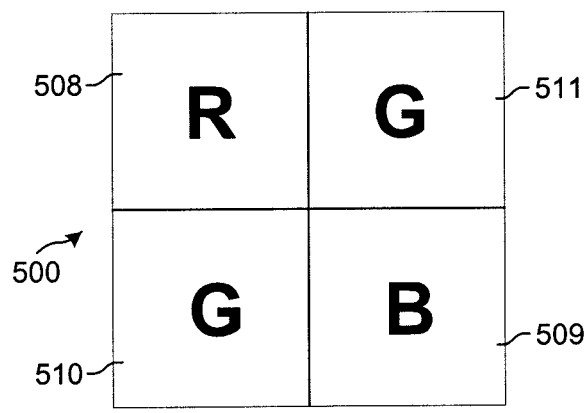
FIG. 5A is a diagram showing a prior art Bayer mosaic pattern.
Figure 5B:
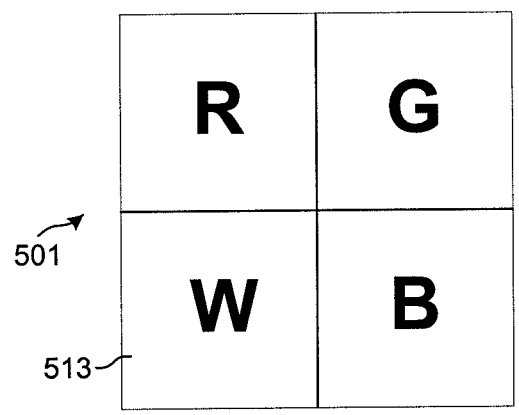
FIG. 5B is a diagram showing a Bayer mosaic pattern modified in accordance with the present system.
Figure 5C:
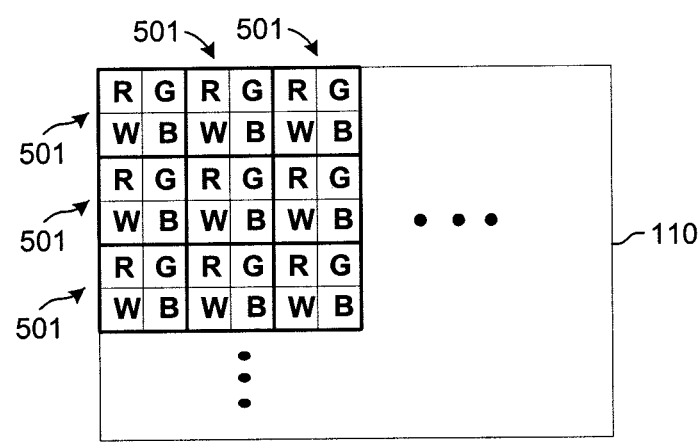
FIG. 5C is an exemplary diagram of a color filter mosaic comprising an array of cells.

FIG. 5A is a diagram showing a single four-pixel filter cell 500 with a prior art Bayer mosaic pattern. FIG. 5B is an exemplary diagram showing one cell 501 in a mosaic pattern modified in accordance with the present exemplary embodiment, and FIG. 5C is an exemplary diagram of a color filter mosaic 117 (FIG. 1) comprising an array of cells 501. In the present embodiment, the present lens system 100 uses a sensor array 105 comprising a filter mosaic 501 with a 'white light pixel' 513 replacing one of the green pixels (e.g., pixel 511) in each cell of the Bayer pattern.

In the present embodiment, sensor 105 comprises a sensor array with a color filter mosaic 117 which comprises patterns 501 of RGBW (red, green, blue, and 'white light', or transparent) filters, each of which is placed over respective pixels (or pixel sensors) of image sensor 105 to filter/capture color information. Normally, each cell of the Bayer pattern includes two green pixels 510/511, one red pixel 508, and one blue pixel 509, as shown in FIG. 5A. In the present embodiment, shown in FIG. 5B, one of the green pixels (510 or 511) in each cell 501 of a corresponding Bayer mosaic is replaced with a 'white light pixel' 513 (i.e., a pixel with no color filter) to provide increased light collection and an increased signal to noise ratio, which is possible if individual color channels are not processed, per the embodiment of FIG. 3.

Combinations of Features

Features described above as well as those claimed below may be combined in various ways without departing from the scope hereof. The following examples illustrate possible combinations:

(a) An optical system for generating an image having extended depth of field may include a chromatic wavefront coding lens providing axial color separation of light transmitted therethrough by generating specified chromatic aberration in an image created thereby. An optical transfer function of the optical system may exhibit an extended depth of field and contain no zeroes within a limited spatial frequency range, within at least one spectral passband of interest.

(b) In the optical system denoted as (a), the specified chromatic aberration may be determined by a minimum modulation transfer function (MTF) requirement at the spatial frequency of interest within a specified extended depth of focus.

(c) In the optical systems denoted as (a) or (b), there may be three said spectral passbands of interest, respectively corresponding to color channels of the optical system.

(d) In any of the optical systems denoted as (a) through (c), a maximum spatial frequency of the limited spatial frequency range may be less than a spatial frequency limited by pixel-to-pixel spacing of a sensor of the system.

(e) Any of the optical systems denoted as (a) through (d) may include a phase mask that alters the optical transfer function of the optical system such that the optical transfer function thus altered is substantially insensitive to the distance between an object and the lens over a greater range of object distances than that provided by the unaltered optical transfer function. Digital processing may be performed on the image to generate a processed image having said extended depth of field by reversing a decrease in modulation transfer function generated by the phase mask.

(f) An optical system for generating an image having extended depth of field may include a chromatic wavefront coding lens and a phase mask, wherein light transmitted through the optical system is focused into an image plane. The chromatic wavefront coding lens provides axial color separation by providing specified chromatic aberration in an intermediate image incident on the image plane. The phase mask causes an optical transfer function of the optical system to remain substantially constant within a specified range away from the image plane. The optical transfer function of the optical system exhibits an extended depth of field and contains no zeroes within a limited spatial frequency range, within at least one spectral passband of interest.

(g) In the optical system denoted as (f), the specified chromatic aberration may be determined by a minimum modulation transfer function (MTF) requirement at a spatial frequency of interest within a specified extended depth of focus.

(h) In the optical systems denoted as (f) or (g), the intermediate image may be captured by an image sensor to generate an electrical representation of the intermediate image.

(i) In any of the optical systems denoted as (f) through (h), digital processing may be performed on the electrical representation of the intermediate image, to generate the final image by reversing a decrease in modulation transfer function generated by the phase mask.

(j) In any of the optical systems denoted as (f) through (i), the spectral passband of interest may be at least one bandwidth of the light transmitted through the optical system.

(k) Any of the optical systems denoted as (f) through (j) may further include an image sensor for capturing an electrical representation of the light that is incident at the image plane. The sensor may be overlaid with a color filter mosaic comprising a plurality of cells, each of which contains one red filter, one green filter, one blue filter, and one transparent filter. Each of the filters may be positioned over a respective pixel of the image sensor.

(l) An optical system exhibiting extended depth of field may include: a color-dependent wavefront coding lens system including a chromatic wavefront coding lens and a phase mask, wherein the lens system focuses light transmitted therethrough into an image plane; an image sensor for capturing an electrical representation of the light that is incident at the image plane; and a processor with associated memory in which an image processing algorithm is stored. The chromatic wavefront coding lens may be designed to provide specified chromatic aberration in an intermediate image formed on the sensor. The intermediate image may be subsequently processed by the processor, using the algorithm, to generate a final image having the extended depth of field.

(m) In the optical system denoted as (l), the phase mask may cause an optical transfer function of the optical system to remain substantially constant within a specified range away from an in-focus position, and the digital processing may be performed on the stored image to generate the final image by reversing a decrease in modulation transfer function generated by the phase mask.

(n) In the optical systems denoted as (l) or (m), continuous in-focus depth-of-field of the lens system may be expanded to a range between an object distance at a closest in-focus Blue image component and an object distance at a most distant in-focus Red image component, at a highest common through-focus modulation transfer function that provides continuous in-focus images of the Red, Green, and Blue image components.

(o) In any of the optical systems denoted as (l) through (n), the color-dependent wavefront coding lens system may be formed by integrating the phase mask and the chromatic wavefront coding lens into a single unit.

(p) In any of the optical systems denoted as (l) through (o), the image sensor may be overlaid with a color filter mosaic comprising a plurality of cells, each of which contains one red filter, one green filter, one blue filter, and one transparent filter. Each of the filters may be positioned over a respective pixel of the image sensor.

(q) A method for generating an image having extended depth of field may include optically coupling a phase mask and a chromatic wavefront coding lens to form an optical system that focuses light transmitted through the optical system into the image. The chromatic wavefront coding lens may provide axial color separation of the light transmitted therethrough by generating specified chromatic aberration in the image. An optical transfer function of the optical system may contain no zeroes within a spectral passband of interest.

(r) In the method denoted as (q), the specified chromatic aberration may be determined by a minimum modulation transfer function requirement at a spatial frequency of interest within a specified extended depth of focus.

(s) In the methods denoted as (q) or (r), light transmitted through the optical system may be focused into an image plane. The phase mask may cause the optical transfer function of the optical system to remain substantially constant within a specified range away from the image plane.

(t) In any of the methods denoted as (q) through (s), the optical transfer function of the optical system may contain no zeroes within at least one bandwidth of the light transmitted through the optical system.

(u) In any of the methods denoted as (q) through (s), digital processing may be performed on the image to generate a processed image having said extended depth of field by reversing a decrease in modulation transfer function generated by the phase mask.

(v) A method for increasing depth of field of an optical system for focusing light that is received from an object into an image plane, wherein the optical system is characterized by an unaltered optical transfer function and includes an image sensor for storing a representation of the light that is incident at the image plane, may include constructing an optical phase mask which comprises a depth of field increasing feature to generate an altered optical transfer function of the optical system, such that the altered optical transfer function is substantially insensitive to the distance between the object and the lens over a specified range of object distances that is greater than that provided by the unaltered optical transfer function. The method may also include constructing a chromatic wavefront coding lens that provides axial color separation of the light transmitted therethrough by providing specified chromatic aberration in an intermediate image incident on the image plane, placing the optical mask and the chromatic wavefront coding lens between the object and the sensor, and providing depth of field post-processing of the intermediate image, to reverse a decrease in modulation transfer function generated by the optical mask and the chromatic wavefront coding lens.

(w) In the method denoted as (v), the specified chromatic aberration may be determined by a minimum modulation transfer function requirement at the spatial frequency of interest within a specified extended depth of focus.

(x) In the methods denoted as (v) or (w), the mask constructing step may include examining ambiguity functions of a plurality of candidate mask functions to determine which particular mask function has an optical transfer function that is closest to constant over a specified range of object distances, and constructing the optical mask having the particular mask function.

The invention having been described in detail and by reference to specific embodiments thereof, it should be noted that modifications and variations are possible without departing from the scope of the invention defined in the appended claims. It is thus contemplated that the present system is not limited to the specifically-disclosed aspects thereof.

What is claimed is:

1. An optical system for generating an image having extended depth of field comprising:
    a chromatic wavefront coding lens providing axial color separation of light transmitted therethrough by generating specified chromatic aberration in an image created thereby;
    wherein an optical transfer function of the optical system exhibits an extended depth of field and contains no zeroes within a limited spatial frequency range, within at least one spectral passband of interest.

2. The optical system of claim 1, wherein the specified chromatic aberration is determined by a minimum modulation transfer function (MTF) requirement at the spatial frequency of interest within a specified extended depth of focus.

3. The optical system of claim 1, wherein there are three said spectral passbands of interest, respectively comprising each color channel of the optical system.

4. The optical system of claim 1, wherein a maximum spatial frequency of the limited spatial frequency range is less than a spatial frequency limited by pixel-to-pixel spacing of a sensor of the system.

5. The optical system of claim 1, including a phase mask which alters the optical transfer function of the optical system such that the optical transfer function thus altered is substantially insensitive to the distance between an object and the lens over a greater range of object distances than that provided by the unaltered optical transfer function;
    wherein digital processing is performed on the image to generate a processed image having said extended depth of field by reversing a decrease in modulation transfer function generated by the phase mask.

6. An optical system for generating an image having extended depth of field comprising:
    a chromatic wavefront coding lens and a phase mask, wherein light transmitted through the optical system is focused into an image plane;
    wherein the chromatic wavefront coding lens provides axial color separation by providing specified chromatic aberration in an intermediate image incident on the image plane;
    wherein the phase mask causes an optical transfer function of the optical system to remain substantially constant within a specified range away from the image plane; and
    wherein the optical transfer function of the optical system exhibits an extended depth of field and contains no zeroes within a limited spatial frequency range, within at least one spectral passband of interest.

7. The optical system of claim 6 wherein the specified chromatic aberration is determined by a minimum modulation transfer function (MTF) requirement at a spatial frequency of interest within a specified extended depth of focus.

8. The optical system of claim 6, wherein the intermediate image is captured by an image sensor to generate an electrical representation of the intermediate image.

9. The optical system of claim 8, wherein digital processing is performed on the electrical representation of the intermediate image, to generate the final image by reversing a decrease in modulation transfer function generated by the phase mask.

10. The optical system of claim 6, wherein the spectral passband of interest is at least one bandwidth of the light transmitted through the optical system.

11. The optical system of claim 6, further including an image sensor for capturing an electrical representation of the light that is incident at the image plane, wherein the sensor is overlaid with a color filter mosaic comprising a plurality of cells, each of which contains one red filter, one green filter, one blue filter, and one transparent filter, wherein each of the filters is positioned over a respective pixel of the image sensor.

12. An optical system exhibiting extended depth of field comprising:
    a color-dependent wavefront coding lens system including a chromatic wavefront coding lens and a phase mask, wherein the lens system focuses light transmitted therethrough into an image plane;
    an image sensor for capturing an electrical representation of the light that is incident at the image plane; and
    a processor with associated memory in which an image processing algorithm is stored;
    wherein the chromatic wavefront coding lens is designed to provide specified chromatic aberration in an intermediate image formed on the sensor;
    and wherein the intermediate image is subsequently processed by the processor, using the algorithm, to generate a final image having the extended depth of field.

13. The optical system of claim 12, wherein the phase mask causes an optical transfer function of the optical system to remain substantially constant within a specified range away from an in-focus position, and the digital processing is performed on the stored image to generate the final image by reversing a decrease in modulation transfer function generated by the phase mask.

14. The optical system of claim 12, wherein continuous in-focus depth-of-field of the lens system is expanded to a range between an object distance at a closest in-focus Blue image component and an object distance at a most distant in-focus Red image component, at a highest common through-focus modulation transfer function that provides continuous in-focus images of the Red, Green, and Blue image components.

15. The optical system of claim 12, wherein the color-dependent wavefront coding lens system is formed by integrating the phase mask and the chromatic wavefront coding lens into a single unit.

16. The optical system of claim 12, wherein the image sensor is overlaid with a color filter mosaic comprising a plurality of cells, each of which contains one red filter, one green filter, one blue filter, and one transparent filter, wherein each of the filters is positioned over a respective pixel of the image sensor.

17. A method for generating an image having extended depth of field comprising:
    optically coupling a phase mask and a chromatic wavefront coding lens to form an optical system that focuses light transmitted through the optical system into the image;
    wherein the chromatic wavefront coding lens provides axial color separation of the light transmitted therethrough by generating specified chromatic aberration in the image; and
    wherein an optical transfer function of the optical system contains no zeroes within a spectral passband of interest.

18. The method of claim 17 wherein the specified chromatic aberration is determined by a minimum modulation transfer function requirement at a spatial frequency of interest within a specified extended depth of focus.

19. The method of claim 17, wherein light transmitted through the optical system is focused into an image plane; and
    wherein the phase mask causes the optical transfer function of the optical system to remain substantially constant within a specified range away from the image plane.

20. The method of claim 17, wherein the optical transfer function of the optical system contains no zeroes within at least one bandwidth of the light transmitted through the optical system.

21. The method of claim 17, wherein digital processing is performed on the image to generate a processed image having said extended depth of field by reversing a decrease in modulation transfer function generated by the phase mask.

22. A method for increasing depth of field of an optical system for focusing light that is received from an object into an image plane, wherein the optical system is characterized by an unaltered optical transfer function and includes an image sensor for storing a representation of the light that is incident at the image plane, the method comprising:
    constructing an optical phase mask which comprises a depth of field-increasing feature to generate an altered optical transfer function of the optical system, such that the altered optical transfer function is substantially insensitive to the distance between the object and the lens over a specified range of object distances that is greater than that provided by the unaltered optical transfer function;
    constructing a chromatic wavefront coding lens which provides axial color separation of the light transmitted therethrough by providing specified chromatic aberration in an intermediate image incident on the image plane;
    placing the optical mask and the chromatic wavefront coding lens between the object and the sensor; and
    providing depth of field post-processing of the intermediate image, to thereby reverse a decrease in modulation transfer function generated by the optical mask and the chromatic wavefront coding lens.

23. The method of claim 22, wherein the specified chromatic aberration is determined by a minimum modulation transfer function requirement at the spatial frequency of interest within a specified extended depth of focus.

24. The method of claim 22, wherein the mask constructing step includes examining ambiguity functions of a plurality of candidate mask functions to determine which particular mask function has an optical transfer function that is closest to constant over a specified range of object distances, and constructing the optical mask having the particular mask function.

* * * * *